United States Patent
Kim et al.

(10) Patent No.: US 10,338,326 B2
(45) Date of Patent: Jul. 2, 2019

(54) MULTI-CHANNEL OPTICAL SUBASSEMBLY STRUCTURE COMPRISING AN ALIGNMENT JIG AND METHOD OF PACKAGING THE STRUCTURE

(71) Applicant: ELECTRONICS AND TELECOMMUNICATIONS RESEARCH INSTITUTE, Daejeon (KR)

(72) Inventors: Jeong Eun Kim, Gwangju (KR); Hyun Seo Kang, Gwangju (KR); Keo Sik Kim, Gwangju (KR); Sung Chang Kim, Gwangju (KR); Young Sun Kim, Gwangju (KR); Ji Hyoung Ryu, Jeonju (KR); Hyoung Jun Park, Gwangju (KR); Dong Hoon Son, Gwangju (KR); Chan Il Yeo, Gwangju (KR); Young Soon Heo, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 145 days.

(21) Appl. No.: 15/581,852

(22) Filed: Apr. 28, 2017

(65) Prior Publication Data
US 2018/0100978 A1 Apr. 12, 2018

(30) Foreign Application Priority Data
Oct. 7, 2016 (KR) ........................ 10-2016-0129671

(51) Int. Cl.
*G02B 6/42* (2006.01)
*G02B 6/32* (2006.01)

(52) U.S. Cl.
CPC ............. *G02B 6/4226* (2013.01); *G02B 6/32* (2013.01); *G02B 6/425* (2013.01); *G02B 6/4225* (2013.01);
(Continued)

(58) Field of Classification Search
CPC .. G02B 6/4227; G02B 6/4263; G02B 6/4271; G02B 6/4284
(Continued)

(56) References Cited

U.S. PATENT DOCUMENTS

| 6,736,553 B1 | 5/2004 | Stiehl et al. |
| 6,757,308 B1 | 6/2004 | Eldring et al. |

(Continued)

FOREIGN PATENT DOCUMENTS

| JP | 2006-172697 A | 6/2006 |
| KR | 10-2010-0124112 A | 11/2010 |

(Continued)

*Primary Examiner* — Que Tan Le

(57) ABSTRACT

Provided are a multi-channel optical subassembly structure allowing an optical unit including a light source photodetector chip to be fixed through an alignment jig after active alignment is performed on an individual or single light source photodetector chip by using the alignment jig capable of electrical coupling and one electrode pad and the other electrode pad of a thermoelectric element, which are wirebonded, capable of performing active alignment for each light source photodetector chip, that is, for each channel, capable of replacing the optical unit and the alignment jig when a problem occurs in some or all channels, capable of improving optical coupling efficiency for each channel, and capable of addressing a time-consuming and economically expensive work in which an optical subassembly is discarded when some channels fail, and a method of packaging the structure.

14 Claims, 18 Drawing Sheets

(52) U.S. Cl.
CPC ......... *G02B 6/4227* (2013.01); *G02B 6/4263* (2013.01); *G02B 6/4271* (2013.01); *G02B 6/4284* (2013.01)

(58) Field of Classification Search
USPC ........................................................ 250/551
See application file for complete search history.

(56) References Cited

U.S. PATENT DOCUMENTS

| | | | |
|---|---|---|---|
| 9,857,535 B2* | 1/2018 | Heo | ................ G02B 6/29367 |
| 2002/0181899 A1 | 12/2002 | Tartaglia et al. | |
| 2004/0228588 A1 | 11/2004 | Eldring et al. | |
| 2006/0126069 A1 | 6/2006 | Cho et al. | |
| 2008/0282742 A1 | 11/2008 | Colgan et al. | |
| 2010/0290739 A1 | 11/2010 | Kang et al. | |
| 2013/0129281 A1 | 5/2013 | Son et al. | |
| 2015/0139666 A1 | 5/2015 | Lee et al. | |
| 2015/0378114 A1 | 12/2015 | Son et al. | |
| 2016/0161687 A1 | 6/2016 | Rosenberg et al. | |
| 2016/0246014 A1 | 8/2016 | Son et al. | |

FOREIGN PATENT DOCUMENTS

| | | |
|---|---|---|
| KR | 10-2012-0029673 A | 3/2012 |
| KR | 10-2014-0072793 A | 6/2014 |
| KR | 101514243 B1 | 5/2015 |

\* cited by examiner

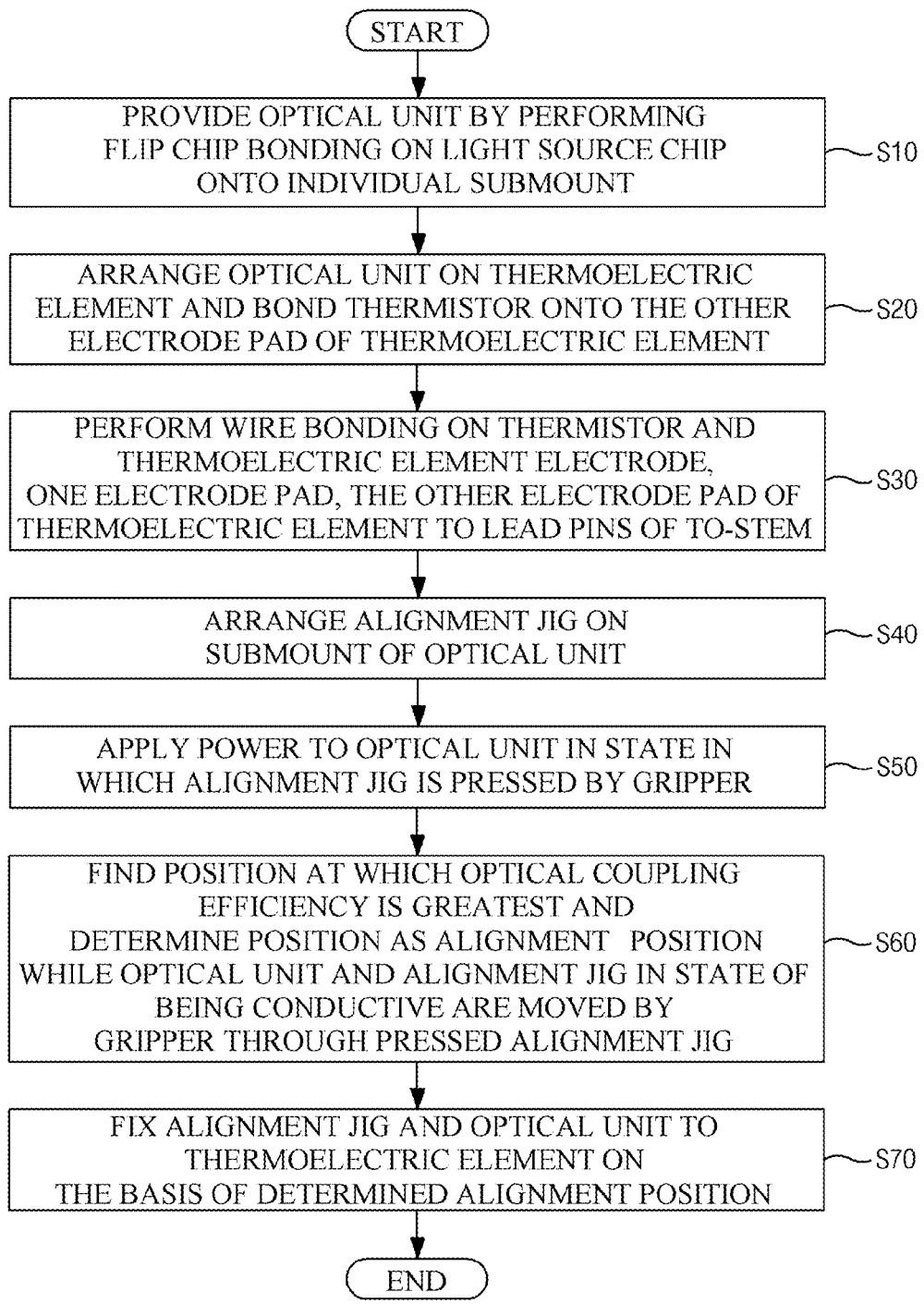

MULTI-CHANNEL OPTICAL SUBASSEMBLY STRUCTURE COMPRISING AN ALIGNMENT JIG AND METHOD OF PACKAGING THE STRUCTURE

CROSS-REFERENCE TO RELATED APPLICATION

This application claims priority to and the benefit of Korean Patent Application No. 10-2016-0129671, filed on Oct. 7, 2016, the disclosure of which is incorporated herein by reference in its entirety.

BACKGROUND

1. Field of the Invention

The present invention relates to a multi-channel optical subassembly structure and a method of packaging the structure, and more particularly, to a multi-channel optical subassembly structure capable of performing active alignment for each channel on light source photodetector chips each including a light source or a photodetector and replacing channels, and a method of packaging the structure.

2. Discussion of Related Art

Recently, in a physical quantity measurement system using light, a wavelength tunable light source of several tens of nanometers has been required.

Generally, a wavelength of light which is output from a plurality of laser diodes (LD) having different output center wavelengths by sequentially modulating a current needs to be linearly and stably changed over time.

In addition, as an amount of data in fiber-optic communications is also rapidly increased, a technology for a multi-channel optical subassembly capable of multiplexing a plurality of light sources having different wavelengths and transmitting the multiplexed light sources through a single optical fiber by applying a wavelength-division multiplexing (WDM) technology is emerging, and research on such a multi-channel optical subassembly or an optical subassembly packaging method are actively progressing.

In order to minimize optical coupling loss during optical subassembly packaging, passive alignment or active alignment is required to be performed on each component. In a passive alignment method, power is not applied to light source photodetector chips and components are bonded at pre-designed and marked positions.

On the other hand, in an active alignment method, since alignment is performed on light source photodetector chips in a state in which power is applied to the light source photodetector chips and light is emitted and received, the light source photodetector chips and their associated components are bonded with optimal optical coupling efficiency.

Therefore, in the passive alignment method, packaging is simple but accuracy is low. In the active alignment method, optical coupling efficiency is high but there is a disadvantage in that a very complicated and precise alignment process is required in a process of applying power to light source photodetector chips.

For example, in Korea Patent Registration No. 10-1176950 as a prior art, an optical subassembly structure capable of performing passive alignment on optical coupling between multi-channel light-emitting or light-receiving devices and optical fibers, which are mounted on a substrate, is disclosed. Here, lens optical fiber connectors each include a focus lens for focusing and guiding light, a prism for changing a traveling direction of the light, and an optical fiber connector for fixing and aligning an optical fiber, which are formed as a single structure, and are passively aligned by being fitted into alignment reference portions that can be connected through holes in the substrate.

However, in a single mode of Korea Patent Registration No. 10-1176950, since a core size of an optical fiber or a cross-sectional size of a waveguide of an optical device (e.g., an optical coupler or an optical splitter) is small by several um, optical coupling efficiency between devices is poor and thus alignment accuracy of approximately ±1 μm or less is required.

Therefore, since high-precision machining capable of minimizing production tolerance of each component is required to perform passive alignment, process costs are high and it is very difficult to achieve alignment accuracy of ±1 μm or less by only passive alignment even with high-precision machining. Therefore, active alignment is required for high optical coupling efficiency.

Meanwhile, in U.S. Pat. No. 6,757,308 which relates to a transmitter optical subassembly (TOSA) structure, a structure in which vertical cavity surface emitting laser (VCSEL) array light sources are coupled through optical fibers by using a lens array, and a method of coupling the VCSEL array light sources are disclosed.

In the above U.S. Pat. No. 6,757,308, the VCSEL array light sources are produced in an array having a predetermined interval and lenses are also produced in an array. In this case, since a very small number of errors are generated in each channel, active alignment may be performed on all channels rather than alignment for each channel.

However, for example, in fiber-optic communications, since a light source wavelength spacing of a coarse wavelength-division multiplexing (CWDM) is about 20 nm and an output wavelength spacing of a light source for each channel is about several nm in a wavelength tunable optical subassembly in which a wavelength of several tens of nanometers may be tuned, it is impossible to produce light sources in an array.

Therefore, a single light source photodetector chip (e.g., a chip including a light source and a photodetector or a chip including a light source or a photodetector) is produced and used by die bonding or flip chip bonding. In this case, since a bonding error is about several μm and a cross-sectional size of a waveguide of a multiplexer (MUX) for focusing single mode optical fibers or multi-wavelength light sources is as small as about 9 μm, coupling efficiency is significantly lowered due to a small number of errors caused by the bonding. Therefore, it is necessary to perform active alignment on light source photodetector chips individually.

However, as described above, since the active alignment may be performed only when the light source photodetector chips are kept in an operating state, wire bonding is required to apply a current to the light source photodetector chips. Accordingly, since the light source photodetector chips may not be moved due to the wire bonding, there is a problem in that alignment is impossible.

In addition to such a problem of alignment between channels, there is a problem, which is one of difficulties in multi-channel packaging, in that the entire optical subassembly are discarded since only a failed channel may not be replaced when some channels fail.

Therefore, in technology for a wavelength tunable optical subassembly packaging and a multi-channel bidirectional optical subassembly packaging in a physical quantity measurement system related to the present invention, there is an urgent need to develop a technology for enabling to perform active alignment on the light source photodetector chips for each channel and for enabling channel replacement when some or all the channels do not operate, so that coupling efficiency for each channel is improved when optical coupling is directly or indirectly performed on a light source photodetector chip serving as a light source or a photodetector and an optical element (e.g., when emitted or received light is coupled via a lens, a bean splitter, or the like).

SUMMARY OF THE INVENTION

The present invention is directed to a multi-channel optical subassembly structure allowing an optical unit including a light source photodetector chip to be fixed through an alignment jig after active alignment is performed on an individual or single light source photodetector chip by using the alignment jig capable of electrical coupling and one electrode pad and the other electrode pad of a thermoelectric element, which are wire-bonded, capable of performing active alignment for each light source photodetector chip, that is, for each channel, capable of replacing the optical unit and the alignment jig when a problem occurs in some or all channels, capable of improving optical coupling efficiency for each channel, and capable of addressing a time-consuming and economically expensive work in which an optical subassembly is discarded when some channels fail, and a method of packaging the structure.

According to an aspect of the present invention, there is provided a multi-channel optical subassembly structure based on a transistor outline (TO) metal-can package, the multi-channel optical subassembly structure includes a module assembly mounted on a module housing of the multi-channel optical subassembly structure and having a plurality of lead pins arranged on a TO-stem, a thermoelectric element arranged on an upper surface of the TO-stem with respect to a position between the lead pins and having one electrode pad and the other electrode pad formed on an upper surface thereof, a plurality of submounts having a plurality of light source photodetector chips which are multi-channel light sources and photocouplers of the multi-channel optical subassembly structure each mounted by an upper electrode pad thereof, respectively, and arranged on the upper surface of the thermoelectric element so as not to be in contact with the one electrode pad and the other electrode pad, and an alignment jig configured to electrically connect the upper electrode pad of each of the submounts to the one electrode pad or the other electrode pad of the thermoelectric element so that fine alignment is performed while power is applied to the light source photodetector chip.

The module assembly may further include a thermistor mounted on the other electrode pad of the thermoelectric element to measure a temperature of the module assembly.

The multi-channel optical subassembly structure may further include an optical device, which is a lens-integrated planer light-wave circuit (PLC) device capable of focusing multi-channel light sources respectively emitted from the light source photodetector chips or a device capable of focusing the multi-channel light sources on each optical fiber provided for each light source photodetector chip.

The multi-channel optical subassembly structure may further include a housing cover mounted on the TO-stem and coupled to an edge of the module housing, in which the optical device is provided, to protect the optical device, the thermistor, the lead pins, the thermoelectric element, the light source photodetector chips, the submounts, and the alignment jig from external environment.

The alignment jig may include a guide ring including a hole having a size enough to be fitted into the light source photodetector chip or the optical fiber, a pair of extension members configured to extend from one side surface and the other side surface of the guide ring to a side surface of the submount in a longitudinal direction of the submount, respectively, leg members bent downward from ends of the extension members, respectively, a pair of wing members bent from one ends of the leg members in an outward direction of the side surface of the submount, and metal coated portions integrally stacked on bottom surfaces of the wing members, bottom surfaces of the leg members, bottom surfaces of the extension members, and both side bottom surfaces of the guide ring, wherein one portion of the metal coated portion corresponding to the bottom surface of the wing member may be in contact with the one electrode pad or the other electrode pad of the thermoelectric element, and the other portion of the metal coated portion corresponding to the bottom surface of the extension member may be in contact with the upper electrode pad of the submount.

The guide ring of the alignment jig may be formed to have the same thickness as that of the extension member so as to surround side surfaces of the light source photodetector chip in a noncontact state.

The guide ring of the alignment jig may be formed to have a thickness relatively greater than that of the extension member so that the guide ring of the alignment jig surrounds a circumferential surface of the optical fiber in a noncontact state and an encapsulant used for butt coupling between the optical fiber and the light source photodetector chip does not flow.

The wing member of the alignment jig may have a first wing member length smaller than half a width of the one electrode pad or the other electrode pad or a second wing member length greater than half the width in order to use or replace the alignment jig.

The alignment jig may be formed of a ceramic material or an insulating material except for the metal coated portions.

The multi-channel optical subassembly structure may further include a gripper capable of holding the leg members of the alignment jig so as to press the alignment jig placed on the submount toward the one electrode pad and the other electrode pad of the thermoelectric element or move the submount in a planar direction.

The gripper may include a pair of tweezers spaced apart from each other in correspondence with a distance between the leg members located at both sides of the alignment jig in order not to be obstacles to light emitted during active alignment or the optical fiber, bodies primarily bent horizontally at upper ends of the tweezers, respectively, secondarily bent toward an incised portion to be close to each other, joined to each other at the incised portion, and having an elastic force corresponding to a frictional force so that the tweezers exert the frictional force against outer surfaces of the leg members, and a handle integrated with the bodies at an opposite position of the tweezers.

The gripper may be formed in a straight bar shape so that the handle protrudes from the bodies in an extending direction of the incised portion.

The gripper may be formed in a bending bar shape so that the handle is bent and extends in a direction perpendicular to an extending direction of the incised portion from the bodies.

The gripper may be formed of a ceramic material or a metal material.

According to another aspect of the present invention, there is provided a method of packaging a multi-channel optical subassembly structure based on TO-can, in which active alignment of light source photodetector chips is performed using a gripper and an alignment jig, the method includes providing an optical unit by performing flip chip bonding on the light source photodetector chip onto an individual submount, arranging the optical unit on a thermoelectric element and bonding a thermistor onto the other electrode pad of the thermoelectric element, performing wire bonding on the thermistor and a thermoelectric element electrode, one electrode pad, and the other electrode pad of the thermoelectric element to lead pins of a TO-stem, arranging an alignment jig on the submount of the optical unit, applying power to the optical unit in a state in which the alignment jig is pressed by a gripper, finding a position at which optical coupling efficiency is greatest and determining the position as an alignment position while the optical unit and the alignment jig in a state of being conductive are moved by the gripper through the pressed alignment jig, and fixing the alignment jig and the optical unit to the thermoelectric element on the basis of the determined alignment position.

In the fixing of the alignment jig and the optical unit to the thermoelectric element, a bonding material may be applied to bottom surfaces of extension members of the alignment jig and ends of bottom surfaces of wing members, and electrical contact with metal coated portions of the alignment jig connected to the optical unit and the one electrode pad and the other electrode pad of the thermoelectric element may be maintained.

In the fixing of the alignment jig and the optical unit to the thermoelectric element, when metal coated portions of bottom surfaces of the extension members of the alignment jig and bottom surfaces of the wing members are formed of a solder, soldering may be performed by heating, and electrical connection of an upper electrode pad of the submount to the one electrode pad and the other electrode pad of the thermoelectric element may be maintained through the metal coated portions made of the solder.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 7 is a flowchart for describing a method of packaging the multi-channel optical subassembly structure according to one embodiment of the present invention;

DETAILED DESCRIPTION OF EXEMPLARY EMBODIMENTS

Advantages and features of the present invention and methods of achieving the same will be clearly understood with reference to the accompanying drawings and the following detailed embodiments. However, the present invention is not limited to the embodiments to be disclosed, but may be implemented in various different forms. The embodiments are provided in order to fully explain the present invention and fully explain the scope of the present invention for those skilled in the art. The scope of the present invention is defined by the appended claims.

Meanwhile, the terms used herein are provided to only describe embodiments of the present invention and not for purposes of limitation. Unless the context clearly indicates otherwise, the singular forms include the plural forms. It will be understood that the terms "comprise" or "comprising" when used herein, specify some stated components, steps, operations and/or elements, but do not preclude the presence or addition of one or more other components, steps, operations and/or elements.

Hereinafter, exemplary embodiments of the present invention will be described in detail with reference to the accompanying drawings.

Figure 1:
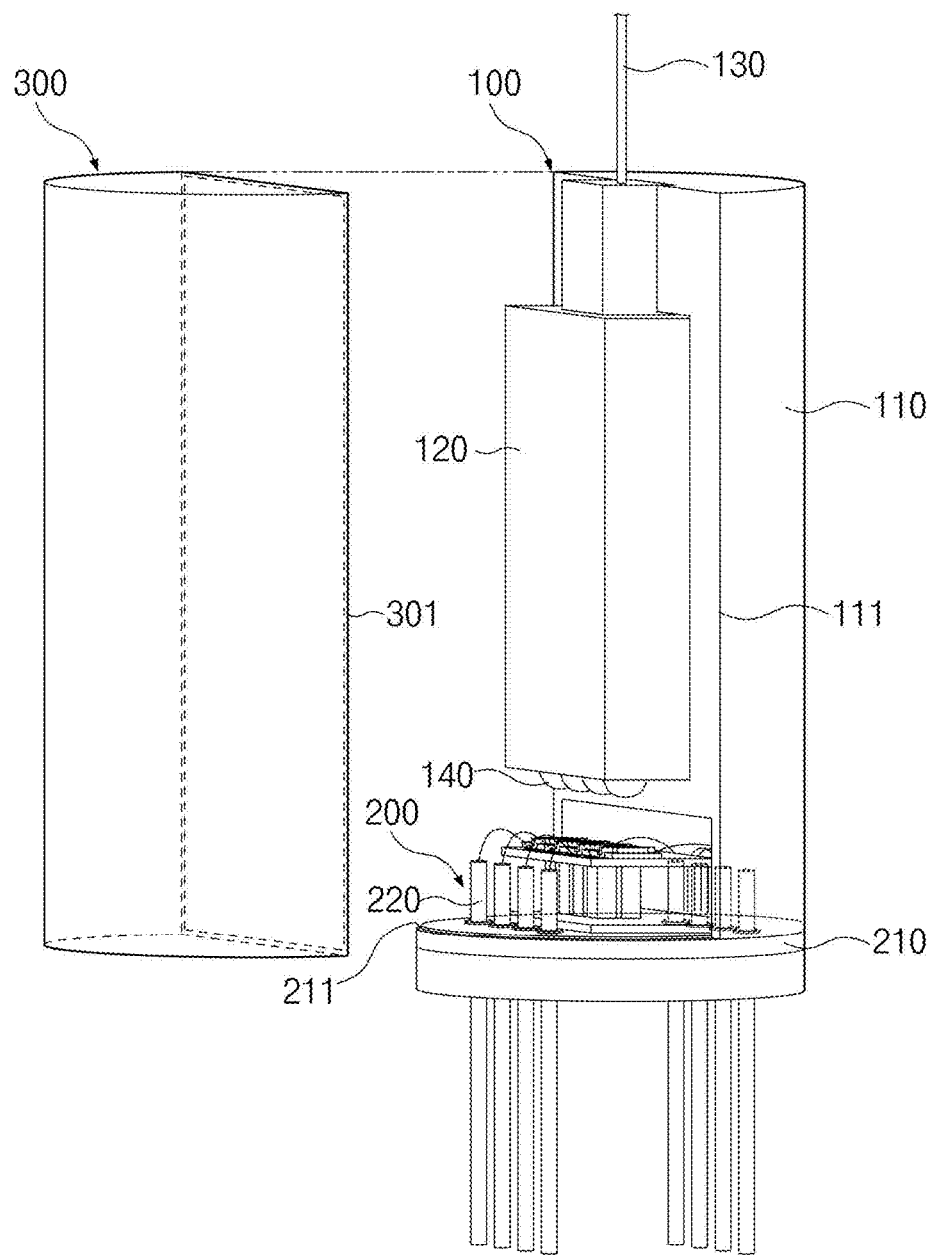
FIG. 1 is an exploded perspective view illustrating a module housing and a housing cover of a multi-channel optical subassembly structure according to one embodiment of the present invention.

FIG. 1 is an exploded perspective view illustrating a module housing and a housing cover of a multi-channel optical subassembly structure according to one embodiment of the present invention.

Referring to FIG. 1, the present embodiment may relate to a wavelength tunable multi-channel optical subassembly in which a light source wavelength spacing of coarse wavelength-division multiplexing (CWDM) is about 20 nm and a wavelength may be tuned by several tens of nanometers.

A multi-channel optical subassembly structure 100 based on a transistor outline metal-can package (TO-can) according to the present embodiment includes a module housing 110, a module assembly 200, and a housing cover 300.

As will be described below, in the multi-channel optical subassembly structure 100, a thermistor and a thermoelectric element may be provided in the module assembly 200 as temperature stabilizing devices.

The multi-channel optical subassembly structure 100 further includes an optical device 120, which is a lens-integrated planer light-wave circuit (PLC) device capable of focusing multi-channel light sources respectively emitted from light source photodetector chips arranged to form multiple channels in the module assembly 200.

The optical device 120 is provided in front of the module housing 110 of the multi-channel optical subassembly structure 100. Here, the optical device 120 may be an optical coupler or an optical splitter.

A main optical fiber 130 is coupled to a top of the optical device 120. Lenses 140 for each channel are provided at a bottom of the optical device 120.

A TO-stem 210 of the module assembly 200 is spaced below the lens 140. An upper surface of a portion of the TO-stem 210 is fixed to a bottom of the module housing 110.

The housing cover 300 may have a structure in which one portion is open toward the optical device 120 and the remaining cover portions are closed by a semicircular upper surface, a curved front surface, and a semicircular bottom surface, and may be coupled to the module housing 110 of the multi-channel optical subassembly structure 100 by bolts, clamps, or the like not illustrated.

The housing cover 300 serves to protect a thermistor, lead pins, a thermoelectric element, light source photodetector chips, submounts, and alignment jigs, which will be described in detail below, and the optical device 120 from external environment. To this end, the housing cover 300 may be mounted on the TO-stem 210 (e.g., in a mounting edge groove 211 formed on an upper surface of an edge of the TO-stem) and coupled to an edge 111 of the module housing 110, on which the optical device 120 is provided.

When the housing cover 300 is assembled with bolts, although not illustrated, a plurality of volt holes spaced apart from each other may be further formed in a fixing unit 301 of the housing cover 300 and the edge 111.

Figure 2:
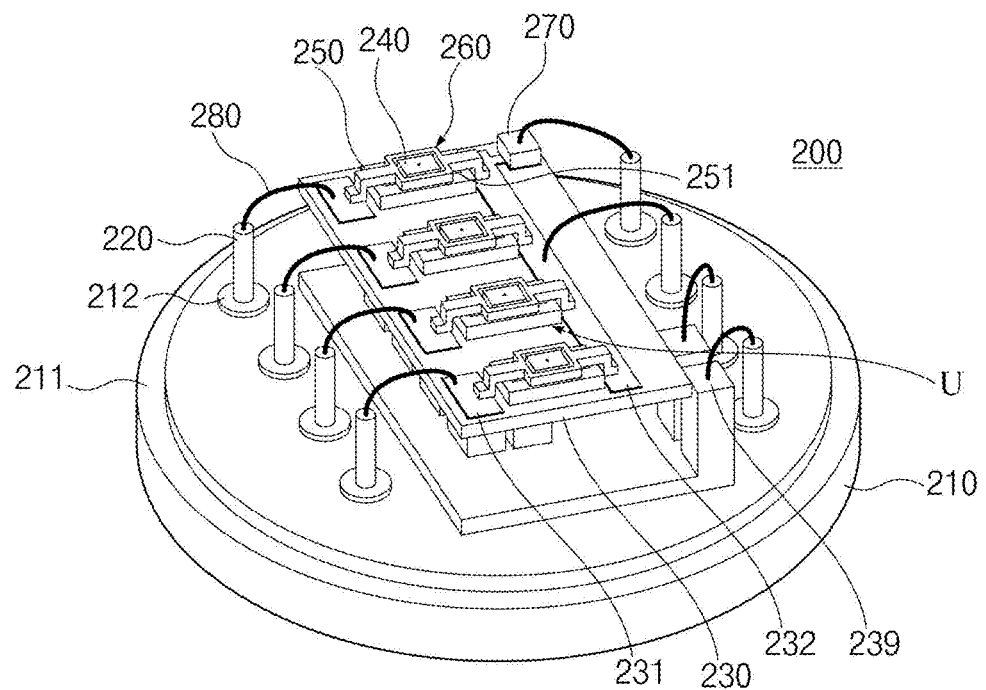
FIG. 2 is a perspective view illustrating a module assembly illustrated in FIG. 1.

FIG. 2 is a perspective view illustrating the module assembly illustrated in FIG. 1.

Referring to FIG. 2, the module assembly 200 may be a device mounted or coupled to the module housing of the multi-channel optical subassembly structure 100 described above.

A plurality of lead pins 220 (e.g., eight lead pins) are arranged on the TO-stem 210 of the module assembly 200. For example, referring to FIGS. 1 and 2, the lead pins 220 are respectively coupled to insulating bushings 212 of a plurality of pin holes formed in the TO-stem 210. An upper portion of each lead pin 220 protrudes to an upper space of the TO-stem 210 and a lower portion of each lead pin 220 extends to a lower space of the TO-stem 210. The lower portion of the lead pin 220 may be connected to an external device not illustrated.

After the external device is electrically coupled to the multi-channel optical subassembly structure 100, power or signals of the external device may be transferred to the lead pins 220 and may not be transferred to the TO-stem 210 due to the insulating bushings 212.

The power or signals may be transferred to a thermoelectric element 230 through wire bonding lines 280 which respectively extend from the lead pins 220. For example, the wire bonding line 280 may be formed between components to be electrically connected in correspondence with each other, like between one electrode pad 231 of the thermoelectric element 230 and the corresponding lead pins 220.

The module assembly 200 includes the thermoelectric element 230, light source photodetector chips 240, submounts 250, and alignment jigs 260.

The thermoelectric element 230 is arranged or fixed on an upper surface of the TO-stem 210 at a position between the lead pins 220. One electrode pad 231 and the other electrode pad 232, which are formed as power supply or signal transmission circuits for the thermoelectric element 230, are formed on an upper surface of the thermoelectric element 230. The one electrode pad 231 and the other electrode pad 232 are spaced apart from each other with a space, in which the submounts 250 are to be provided, interposed therebetween.

The thermoelectric element 230 may further include another thermoelectric element electrode 239 to perform an operation for adjusting temperature.

A plurality of one electrode pads 231 of the thermoelectric element 230 are spaced from each other in an arrangement direction of the submounts 250 at one side (e.g., a left side) which is not in contact with the submounts 250 with respect to the submounts 250. That is, the one electrode pads 231 of the thermoelectric element 230 are separated from each other as positive electrodes of the respective light source photodetector chips 240.

The other electrode pads 232 of the thermoelectric element 230 are integrally extended in the arrangement direction of the submounts 250 at the other side (e.g., a right side) which is not in contact with the submounts 250 with respect to the submounts 250. That is, the other electrode pads 232 of the thermoelectric element 230 may be used as a common ground of all the light source photodetector chips 240 serving as negative electrodes of the respective light source photodetector chips 240. A region in which a thermistor 270 may be mounted may be further provided in the other electrode pad 232.

The light source photodetector chip 240 may be a chip-type small device configured to perform a function as a light source or photodetector for the multi-channel optical subassembly structure 100, or a light source and a photodetector. The light source photodetector chip 240 is mounted and used so as to be electrically conductive with the individual submount 250 in order to perform active alignment. The light source photodetector chip 240 mounted as described above and the submount 250 may become an optical unit.

Figure 8A:
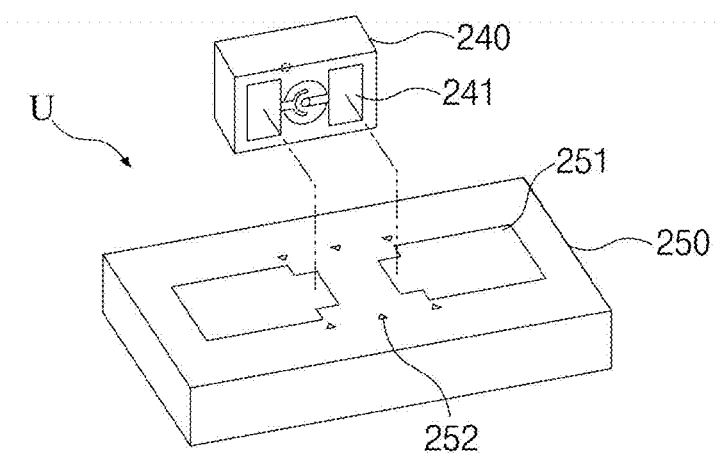
FIGS. 8A to 8F are perspective views for describing the method illustrated in FIG. 7.

For example, referring to FIG. 8A, a pair of upper electrode pads 251 (e.g., a positive electrode and a negative electrode) are formed on an upper surface of each submount 250. Also, a pair of bottom electrode pads 241 (e.g., a positive electrode and a negative electrode) are formed on a bottom surface of the light source photodetector chip 240 so as to correspond and to be conductive with the upper electrode pads 251, respectively.

The bottom electrode pads 241 of the light source photodetector chip 240 may be respectively connected to the upper electrode pads 251 of the submount 250 so as to be electrically conductive with each other, using a fixing means or a mounting material such as epoxy, a solder, or the like not illustrated. For example, the bottom electrode pads 241 of the light source photodetector chip 240 may be electrically coupled to the upper electrode pads 251 of the submount 250, respectively, through flip chip bonding, and thus an optical unit U illustrated in FIG. 8B may be formed.

The plurality of submounts 250, each on which the light source photodetector chip 240 is mounted, that is, a plurality of optical units U, are arranged on the upper surface of the thermoelectric element 230 so as not to come in contact with the one electrode pad 231 and the other electrode pad 232 of the thermoelectric element 230.

The alignment jig 260 is basically a means for active alignment and additionally performs a function of an electrical conduction element.

The alignment jig 260 serves to electrically connect the upper electrode pad 251 of each submount 250 to the one electrode pad 231 or the other electrode pad 232 of the thermoelectric element 230 so that fine alignment is performed while power is applied to the light source photodetector chips 240 (e.g., active alignment is performed while finely moving the optical unit U which is an assembly including a light source photodetector chip and a submount in a state in which power is applied to the light source photodetector chips).

Also, in order to stabilize a temperature of the multi-channel optical subassembly structure 100, the module assembly 200 further includes the thermistor 270 mounted on the other electrode pad 232 of the thermoelectric element 230 so as to measure a temperature of the multi-channel optical subassembly structure 100 or a temperature of the module assembly 200 (e.g., a temperature of the thermoelectric element).

Figure 3A:
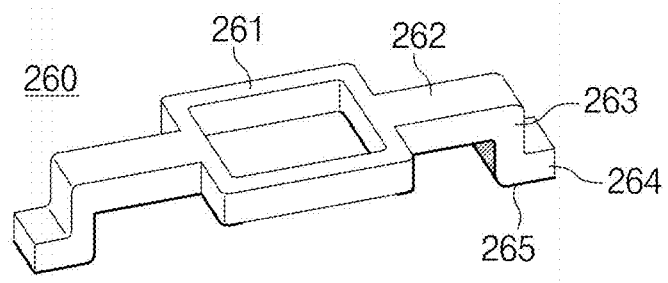
FIGS. 3A and 3B are perspective views illustrating alignment jigs illustrated in FIG. 2.
Figure 3B:
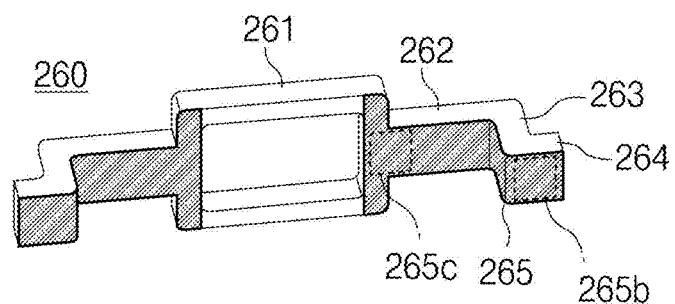

FIGS. 3A and 3B are perspective views illustrating the alignment jigs illustrated in FIG. 2.

Referring to FIGS. 3A and 3B, the alignment jig 260 includes a guide ring 261, extension members 262, leg members 263, wing members 264, and metal coated portions 265, which are integrally formed.

The guide ring 261 has a ring-shaped structure, and the remaining extension members 262, the leg members 263, the wing members 264, and the metal coated portions 265 are arranged so as to be opposite to each other with respect to the guide ring 261 as a pair.

In the alignment jig 260, since the metal coated portions 265 are coupled to a structure such as the guide ring 261, the extension members 262, the leg members 263, and the wing members 264, electrical coupling and active alignment on the optical unit may be performed.

That is, the alignment jig 260 may be in contact with the one electrode pad 231 or the other electrode pad 232 of the thermoelectric element 230 of FIG. 2 so that one portions 265b of the metal coated portions 265 corresponding to bottom surfaces of the wing members 264 respectively correspond to a positive electrode and a negative electrode, and may be in contact with the upper electrode pad 251 of the submount 250 so that the other portions 265c of the metal coated portions 265 corresponding to bottom surfaces of the extension members 262 respectively correspond to a positive electrode and a negative electrode, or the alignment jig 260 may be fixed so as to be electrically conductive by bonding.

The guide ring 261 has a hole having a size enough to be fitted into the light source photodetector chip 240 or the optical fiber.

The extension members 262 extend from one side surface and the other side surface of the guide ring 261 to side surfaces of the submount 250, respectively, in a longitudinal direction of the submount 250.

The leg members 263 are respectively bent downward at one ends of the extension members 262 and have a downwardly extending length corresponding to a thickness of the submount 250.

The wing members 264 are respectively bent from one ends of the leg members 263 in an outward direction of the side surface of the submount 250. An extending direction of the wing members 264 may be parallel to the extending direction of the extension member 262 at a level below a level difference.

The metal coated portions 265 are respectively integrally stacked on the bottom surfaces of the wing members 264, the bottom surfaces of the leg members 263, the bottom surfaces of the extension members 262, and both side bottom surfaces of the guide ring 261.

Also, since there is no metal coated portion 265 in an intermediate region of the bottom surface of the guide ring 261 of the alignment jig 260, one wing member of the alignment jig 260 may become a positive electrode and the other wing member of the alignment jig 260 may become an electrically separated negative electrode.

Referring to FIGS. 2 and 3A, the guide ring 261 of the alignment jig 260 is formed to have the same thickness as that of the extension member 262 so as to surround the side surface of the light source photodetector chip 240 in a noncontact state.

The alignment jigs 260 are formed of a ceramic material or an insulating material except for the metal coated portions 265. Therefore, the light source photodetector chips 240 may be conductive only through the metal coated portions 265.

Figure 4:
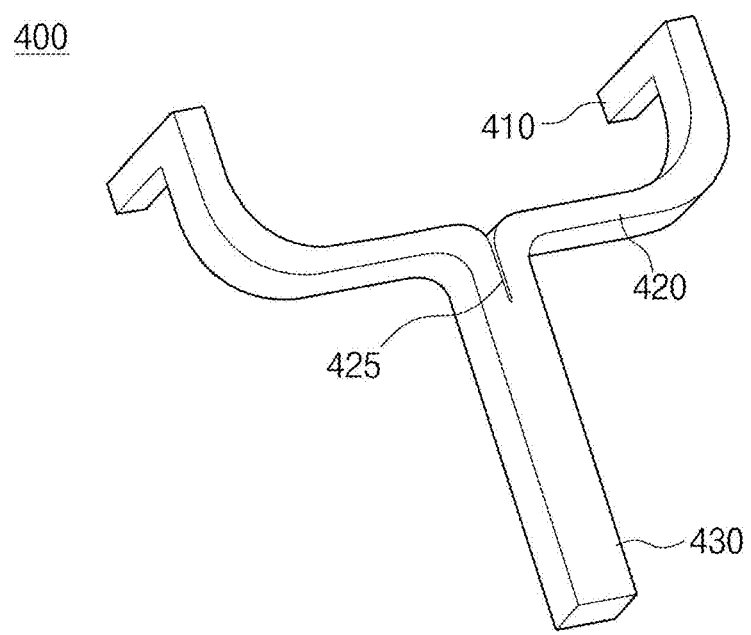
FIG. 4 is a perspective view illustrating a gripper used for active alignment of light source photodetector chips illustrated in FIG. 2.

FIG. 4 is a perspective view illustrating a gripper used for active alignment of the light source photodetector chips illustrated in FIG. 2.

Referring to FIG. 4, the multi-channel optical subassembly structure 100 according to the present embodiment further includes a gripper 400 capable of holding the leg members 263 while pressing the wing members 264 of the alignment jig 260 of FIG. 3A described above.

As will be described below, the gripper 400 serves to press the alignment jigs 260 placed on the optical unit toward the one electrode pad 231 and the other electrode pad 232 of the thermoelectric element 230 or move the optical unit in a planar direction, during fine alignment, that is, active alignment, by an external force (e.g., a force of an operator or a driving force of a robot for alignment).

The gripper 400 may be a tool which is separated from the optical unit after the active alignment and the fixation of the submount 250.

The gripper 400 may be formed of a ceramic material or a metal material and may be formed of a material capable of generating an elastic force.

The gripper 400 includes tweezers 410, bodies 420, and a handle 430.

The tweezers 410 is formed as a pair. The tweezers 410 are spaced apart from each other in correspondence with a distance between the leg members 263 which are located at both sides of the alignment jig 260 in order not to be obstacles to light emitted during active alignment or an optical fiber. For example, a distance between the tweezers 410 may be slightly smaller than the distance between the leg members 263 which are located at the both sides of the alignment jig 260 within an elastic deformation range. When the alignment jig 260 is located in an inner space of the tweezers 410 of the gripper 400, elastic deformation occurs in a direction in which the tweezers 410 and the bodies 420 are distant from each other with respect to an incised portion 425 within the elastic deformation range, and thus the tweezers 410 may then hold the leg members 263 of the alignment jig 260 by a frictional force due to elastic contact. Of course, when the gripper 400 is lifted in a state in which the alignment jig 260 is fixed, the gripper 400 may be separated from the leg members 263 of the alignment jig 260.

The bodies 420 are primarily bent horizontally at upper ends of the tweezers 410, respectively, are secondarily bent toward the incised portion 425 so as to be close to each other, and are joined to each other at the incised portion 425. The body 420 has an elastic force corresponding to the frictional force so that the tweezers 410 exert the frictional force against outer surfaces of the leg members 263 of the alignment jig 260.

Since the gripper 400 includes the incised portion 425, the tweezers 410 and the bodies 420 may serve to hold and move the optical unit which is an object, as free ends having a type of elastic force.

The handle 430 may be integrated with the bodies 420 at an opposite position of the tweezers 410. In this case, one end of the handle 430 is integrally connected to the bodies 420 at a position of the incised portion 425. The other end of the handle 430 is a free end.

Also, for convenience of active alignment by an operator, in the gripper 400, the handle 430 may be formed at an opposite position of the tweezers 410 with respect to the bodies 420. In this case, the handle 430 is formed in a straight bar shape so as to protrude from the bodies 420 in an extending direction of the incised portion 425.

Figure 5:
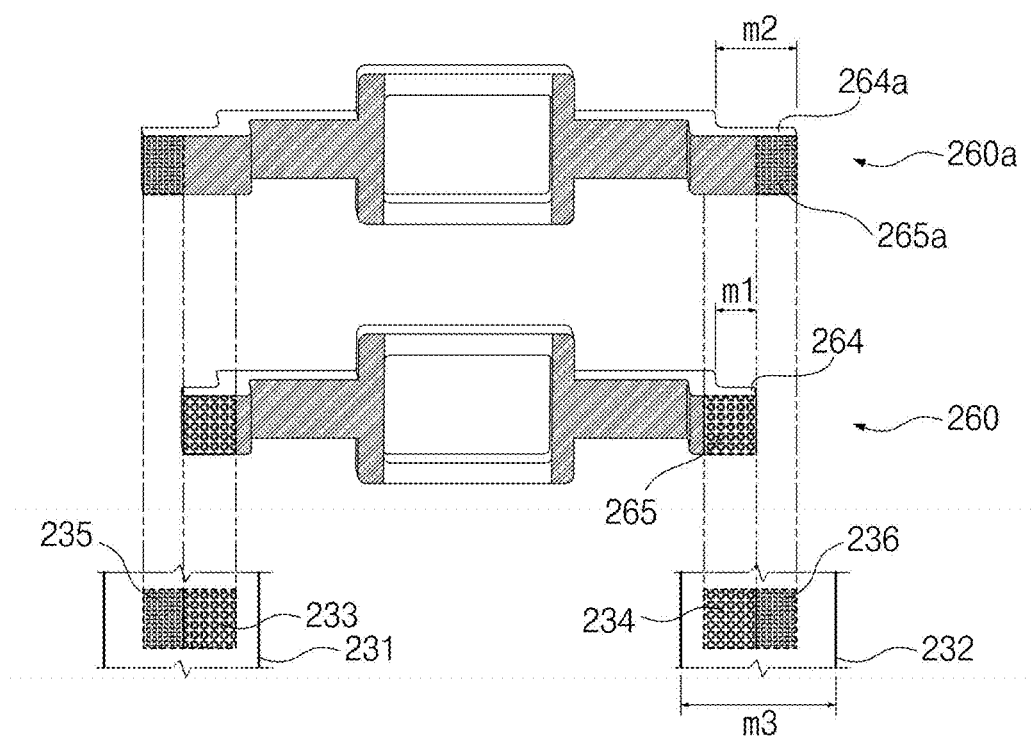
FIG. 5 is a perspective view for describing a method of replacing the alignment jig illustrated in FIG. 2.

FIG. 5 is a perspective view for describing a method of replacing the alignment jig illustrated in FIG. 2.

Referring to FIG. 5, in the present embodiment, alignment jigs 260 and 260a having different specifications may be provided to be replaced.

For example, the alignment jig 260 for primary mounting may be fixed to, that is, may be adhered to primary bonding regions 233 and 234 of the one electrode pad 231 and the other electrode pad 232 of the thermoelectric element 230 after active alignment.

When there is an error in an alignment jig operation and re-active alignment is required, the fixed alignment jig 260 is separated from the thermoelectric element 230 through a replacement operation.

However, since the primary bonding regions 233 and 234 and metal coated portions 265 of the wing members 264 of the alignment jig 260 for primary mounting are damaged by primary adhesion and separation, a problem in that the module assembly of the multi-channel optical subassembly structure may not be reused occurs.

In order to address the problem, wing members 264 and 264a of the alignment jigs 260 and 260a according to the present embodiment have a first wing member length m1 smaller than half a width m3 of the one electrode pad 231 or the other electrode pad 232 or a second wing member length m2 greater than half the width m3, in order to use or replace the alignment jigs 260 and 260a. Here, the second wing member length m2 of the alignment jig 260a for replacement may be designed to be relatively greater than the first wing member length m1 of the pre-installed alignment jig 260 and to be smaller than the width m3 of the one electrode pad 231 or the other electrode pad 232.

That is, the alignment jig 260a for secondary mounting has the same specification as the alignment jig 260 for primary mounting except for the wing member 264a.

Therefore, since metal coated portions 265a of the alignment jig 260a for secondary mounting are electrically adhered to clean secondary bonding regions 235 and 236 (e.g., outer regions) near contaminated primary bonding regions 233 and 234 (e.g., inner regions) of the one electrode pad 231 and the other electrode pad 232 of the thermoelectric element 230 through the replacement operation after the active alignment, the module assembly may be re-used without discarding it.

That is, in the alignment jigs 260 and 260a, there is an advantage in that only the corresponding channel of the optical unit may be replaced when a problem occurs in some or all channels in multiple channels.

For example, when the existing submount 250 and alignment jig 260 which are bonded to each other are separated from each other in order to replace the channel, the one electrode pad 231 and the other electrode pad 232 of the thermoelectric element 230 may be partially damaged. However, since an alignment jig 260a having a wing member 264a longer than the wing member 264 of the previous alignment jig 260 is used to replace when a new submount on which light source photodetector chips are mounted is mounted on the thermoelectric element 230 again, the alignment jig 260a for replacement may be bonded to undamaged portions (e.g., the secondary bonding regions 235 and 236) of the one electrode pad 231 and the other electrode pad 232 of the thermoelectric element 230, and as a result, there is an advantage in that a new submount may be fixed to the thermoelectric element well.

Figure 6:
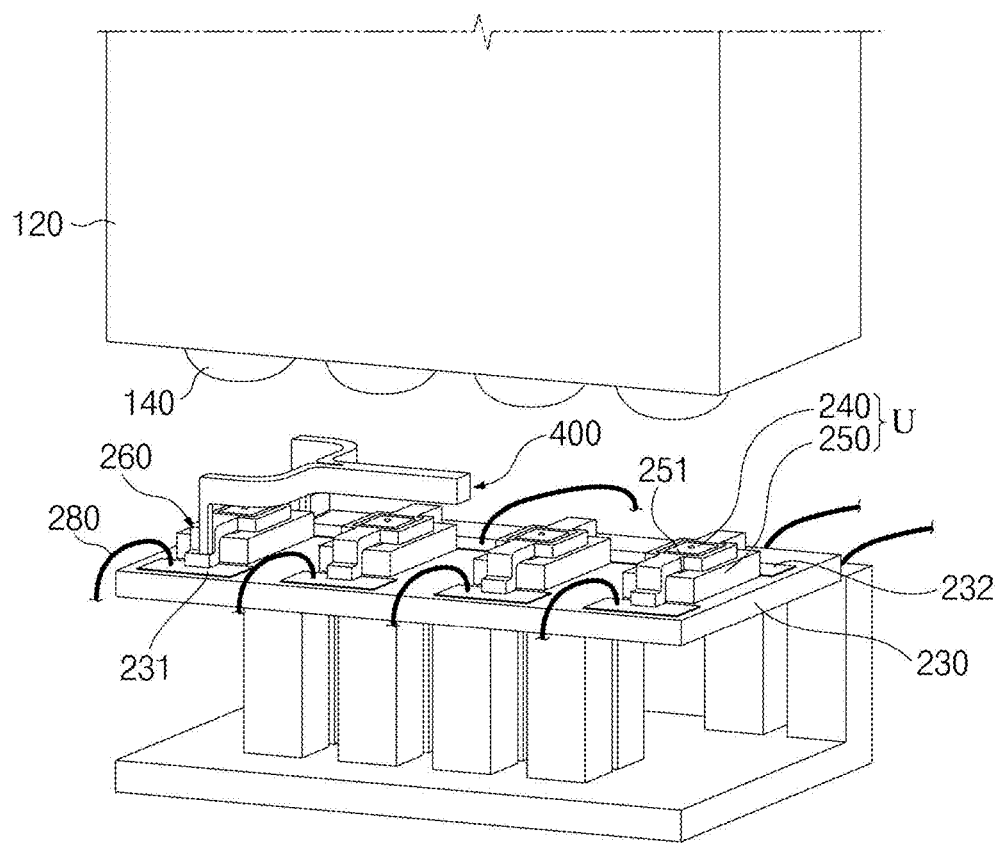
FIG. 6 is a perspective view for describing a method of performing active alignment on the light source photodetector chips in the multi-channel optical subassembly structure illustrated in FIG. 1.

FIG. 6 is a perspective view for describing a method of performing active alignment on the light source photodetector chips in the multi-channel optical subassembly structure illustrated in FIG. 1.

Referring to FIG. 6, according to the present invention, active alignment is performed in a state in which power is applied to the light source photodetector chips 240 through the wire bonding lines 280.

In this case, in the present embodiment, movement corresponding to the active alignment of the optical unit U including the submount 250 may be finely adjusted through the components such as the light source photodetector chip 240, the submount 250, the alignment jig 260, and the gripper 400 as described in detail above.

In this case, the gripper 400 may be horizontally moved by a user's force, a separate automated facility (e.g., a robot for alignment), or the like, and thus active alignment may be performed between the light source photodetector chips 240 and the lens 140 of the optical device 120 while the submount 250 on which the light source photodetector chips 240 are mounted and the alignment jig 260 also move on the one electrode pad 231 and the other electrode pad 232 of the thermoelectric element 230.

Since the alignment jig 260 capable of aligning the submount 250 on which the light source photodetector chips 240 are mounted has the metal coated portions 265 in which both ends of a lower surface of the jig is coated with a metal as described in detail above, the upper electrode pad 251 of the submount 250 may be electrically connected to the one electrode pad 231 or the other electrode pad 232 of the thermoelectric element 230.

In such a state, after the alignment is completed, a bonding material such as epoxy and the like is applied to the bottom surfaces of the extension members 262 of the alignment jig 260 and ends of the bottom surfaces of the wing members 264, and thus electrical contact with the metal coated portion 265 of the alignment jig 260, the upper electrode pad 251 of the submount 250, and the one electrode pad 231 and the other electrode pad 232 of the thermoelectric element 230, which are connected to the optical unit, may be reliably maintained or fixed.

When the metal coated portions 265 of the bottom surfaces of the extension members 262 and the wing members 264 of the alignment jig 260 are formed of a solder (e.g., AuSn), soldering is performed by heating at a predetermined temperature (e.g., several hundreds of ° C.) after the alignment is completed, and electrical connection of the upper electrode pad 251 of the submount 250 and the one electrode pad 231 and the other electrode pad 232 of the thermoelectric element 230 may be maintained through the metal coated portions 265 made of the solder.

When the alignment jig 260 is bonded or soldered in a state in which the submount 250 is pressed by the gripper 400, the submount 250 may be firmly fixed to the thermoelectric element 230 by a bonding force thereof. Therefore, since the bottom surface of the submount 250 does not need to be fixed to the upper surface of the thermoelectric element 230 and only the alignment jig 260 is replaced by a new alignment jig 260a for secondary mounting when some or all of the channels fail as described with reference to FIG. 5, the optical unit or the submount 250 may be easily removed or separated from the thermoelectric element 230.

FIG. 7 is a flowchart for describing a method of packaging the multi-channel optical subassembly structure according to one embodiment of the present invention and FIGS. 8A to 8F are perspective views for describing the method illustrated in FIG. 7.

Referring to FIG. 7, in the method of packaging the multi-channel optical subassembly structure according to the present embodiment, a stepwise method of performing active alignment on light source photodetector chips using a gripper and alignment jigs in the multi-channel optical subassembly structure based on TO-can is provided. Active alignment for each channel, in which optical coupling efficiency between an optical device and an optical unit for each channel (e.g., light source photodetector chips and a submount) of the multi-channel optical subassembly structure may be increased, may be easily performed through the stepwise method.

For example, the method according to the present embodiment includes a step of providing an optical unit by performing flip chip bonding on a light source photodetector chip onto an individual submount (S10) and a step of arranging the optical unit on a thermoelectric element and bonding a thermistor onto the other electrode pad of the thermoelectric element (S20).

Subsequently, the method according to the present embodiment includes a step of performing wire bonding on the thermistor and a thermoelectric element electrode, one electrode pad, the other electrode pad of the thermoelectric element to lead pins of a TO-stem (S30), a step of arranging an alignment jig on the submount of the optical unit (S40), a step of applying power to the optical unit in a state in which the alignment jig is pressed by a gripper (S50), a step of finding a position at which optical coupling efficiency is greatest and determining the position as an alignment position while the optical unit and the alignment jig in a state of being conductive are moved by the gripper through the pressed alignment jig (S60), and a step of fixing the alignment jig and the optical unit to the thermoelectric element on the basis of the determined alignment position (S70).

Figure 8B:
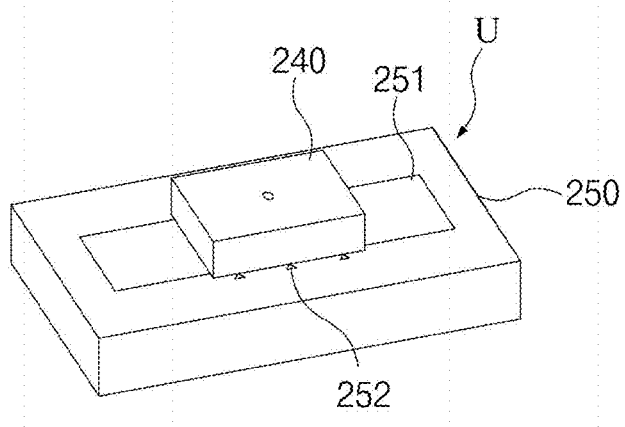

Referring to FIGS. 7 and 8A, in the providing of the optical unit (S10), the bottom electrode pad 241 formed on the bottom surface of the light source photodetector chip 240 is bonded to the upper electrode pad 251 of the submount 250 by a flip chip bonding method using a mounting material such as epoxy, a solder, or the like, and thus an optical unit U illustrated in FIG. 8B is formed.

Specifically, an alignment indicator 252 for arranging or aligning the light source photodetector chip 240 is further formed on the upper surface of the submount 250.

That is, an operator may easily perform a flip chip bonding operation by aligning the upper electrode pad 251 of the submount 250 and the bottom electrode pad 241 of the light source photodetector chip 240 while looking the alignment indicator 252 displayed on the submount 250 on which a single light source photodetector chip 240 may be mounted.

Figure 8C:
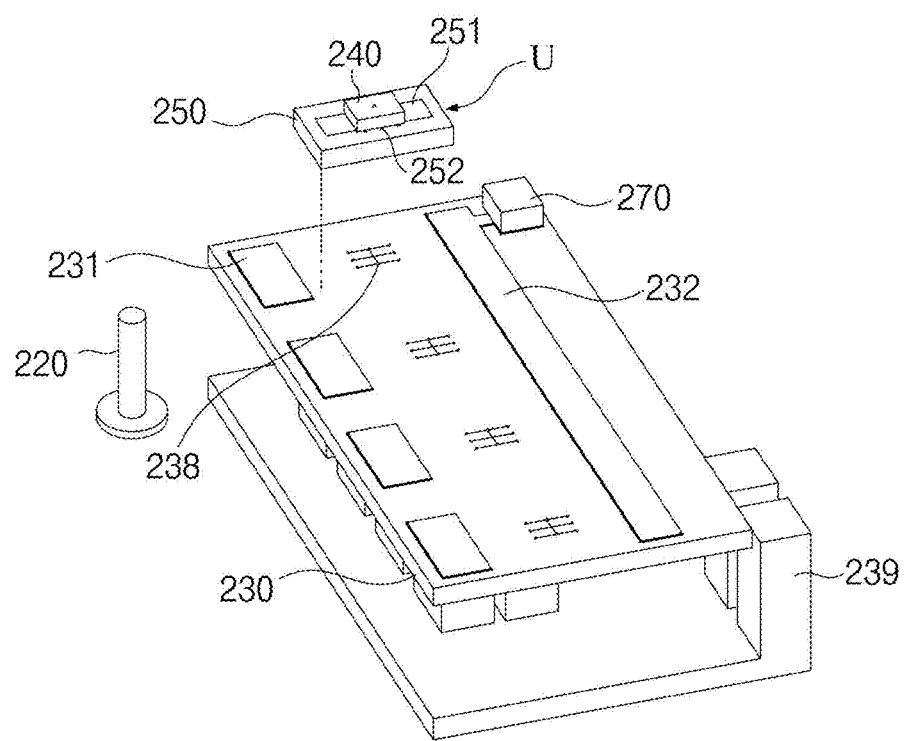
Figure 8D:
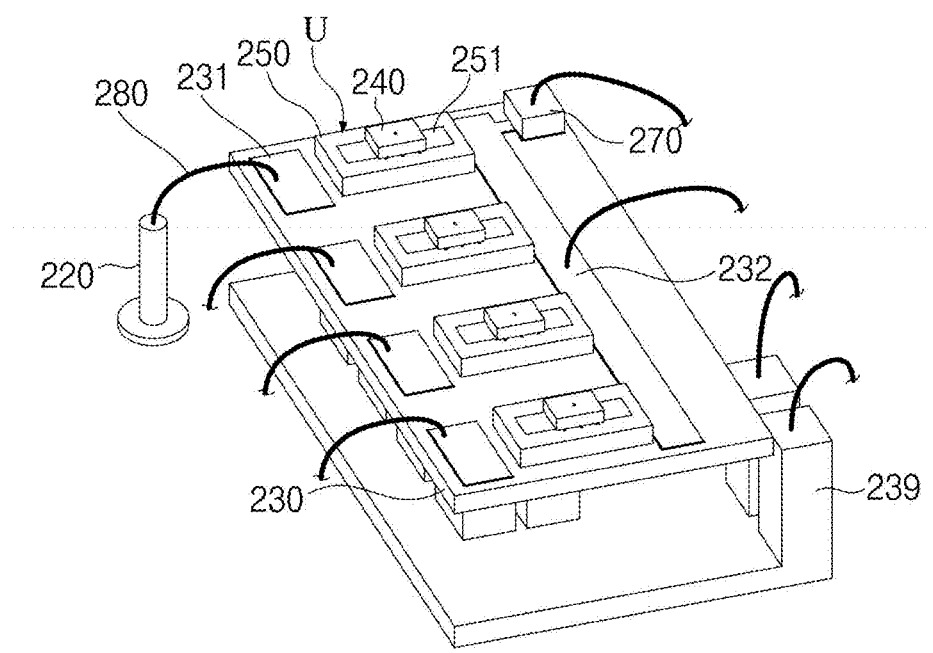

The submount 250 of the optical unit U formed in this manner is arranged and mounted on the thermoelectric element 230 as illustrated in FIGS. 8C and 8D.

In this case, as illustrated in FIG. 8C, passive alignment may be performed at designed positions through the alignment indicator 252 placed on the submount 250 and an element indicator 238 (e.g., a point at which each channel should be located is indicated) placed on the thermoelectric element 230. Here, the element indicator 238 and the alignment indicator 252 are formed on the basis of a position at which the indicators may match with each other at a ratio of 1:1. Specifically, for example, the alignment indicator 252 may be formed in a marker shape so that when the submount 250 is placed on the thermoelectric element 230, whether the submount 250 and the thermoelectric element 230 match with each other is determined with the naked eye.

Also, referring to FIGS. 7 and 8C, the thermistor 270 is mounted on the thermoelectric element 230 through the bonding of the thermistor 270 onto the other electrode pad 232 of the thermoelectric element 230 (S20). That is, since the thermistor 270 is mounted at a pre-designed position, a real-time temperature of the multi-channel optical subassembly structure which is necessary for controlling a temperature of the thermoelectric element 230 may be measured.

Referring to FIGS. 7 and 8D, the operator performs wire bonding to supply power like the performing of wire bonding on the thermistor 270 and the thermoelectric element electrode 239, the one electrode pad 231, and the other electrode pad 232 of the thermoelectric element 230 to the lead pins 220 of the TO-stem 210 (S30). Accordingly, each wire bonding line 280 formed by the wire bonding may supply power to both the thermoelectric element 230 and the thermistor 270. Here, although only one lead pin 220 is illustrated and the others are omitted, a plurality of lead pins 220 may be formed as illustrated in FIG. 2.

Also, the one electrode pad 231 and the other electrode pad 232 for supplying power for the light source photodetector chip 240 each may receive power through the corresponding wire bonding line 280.

Figure 8E:
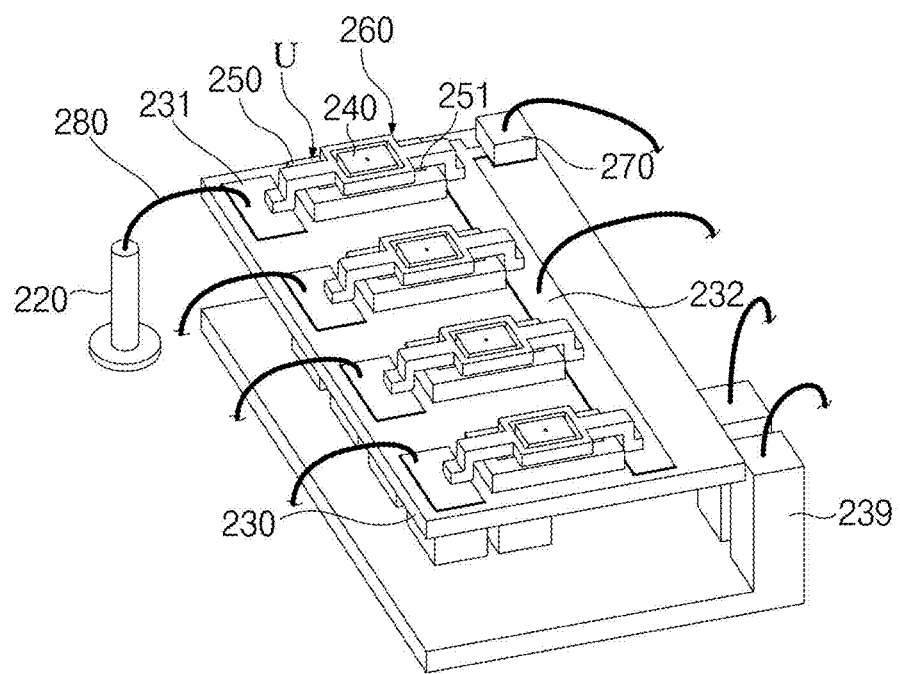

As illustrated in FIG. 8E, the alignment jig 260 capable of moving the submount 250 of the optical unit U is placed on the submount 250 through the arranging of the alignment jig on the submount of the optical unit (S40) of FIG. 7.

Figure 8F:
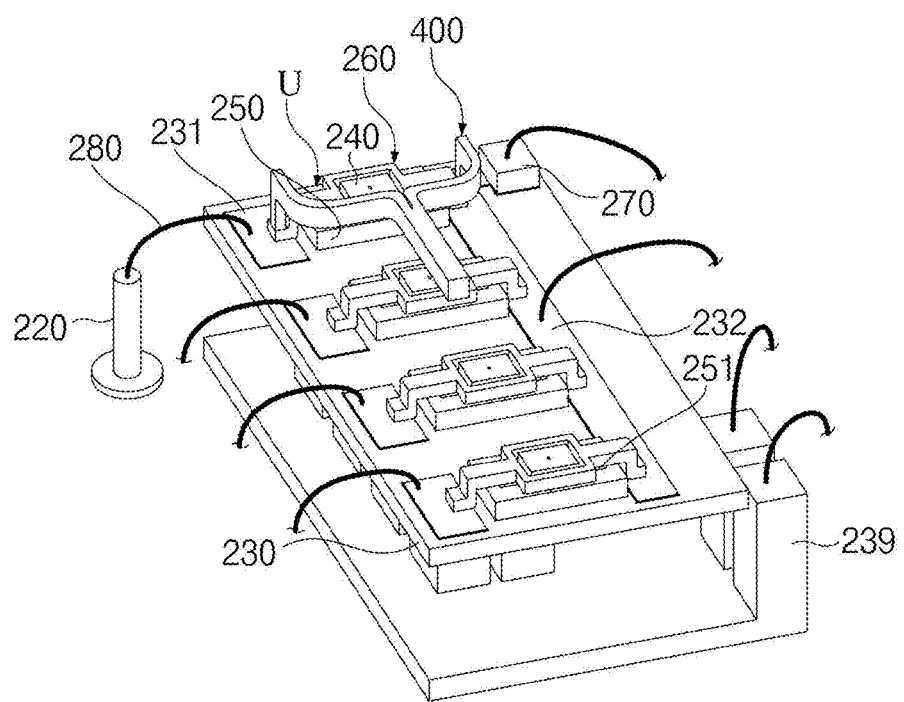

The applying of the power to the optical unit in the state in which the alignment jig of FIG. 7 is pressed by the gripper (S50) is performed as illustrated in FIG. 8F.

That is, referring to FIG. 8E, power may be applied to all the light source photodetector chips 240 of optical units U through the lead pins 220, the wire bonding lines 280, the one electrode pads 231, the other electrode pads 232, and the alignment jigs 260.

The finding of the position at which optical coupling efficiency is greatest and the determining of the position as an alignment position (S60) will be described with reference to FIG. 8F.

Referring to FIG. 8F, the gripper 400 may press the alignment jig 260 toward the thermoelectric element 230, and in this case, the gripper 400 may serve to maintain the conduction to the optical unit U through the alignment jig 260. Also, the gripper 400 may be moved or stopped in a planar direction for active alignment in the state of conduction, and the alignment jig 260 and the optical unit U may also be moved or stopped in response to the movement of the gripper 400.

That is, the operator performs fine alignment on the optical unit U while pressing the gripper 400, wherein fine alignment or active alignment is performed so that the metal coated portions 265 of the bottom surfaces of the wing members 264 of the alignment jig 260 may be brought into close contact with the one electrode pad 231 and the other electrode pad 232 at the position (e.g., the determined alignment position) at which optical coupling efficiency is greatest.

Although not illustrated in FIG. 8F, the fixing of the alignment jig 260 and the optical unit U to the thermoelectric element 230 on the basis of the alignment position (S70) illustrated in FIG. 7 may be performed while the gripper 400 is kept pressed.

The description of the alignment jig 260 and the optical unit U being fixed to the thermoelectric element 230 includes the metal coated portions 265 corresponding to the bottom surface of the wing member 264 of the alignment jig 260 being respectively fixed to the one electrode pad 231 and the other electrode pad 232 by performing bonding to be electrically conductive, and the metal coated portions 265 corresponding to the bottom surface of the extension member 262 of the alignment jig 260 being respectively fixed to the upper electrode pad 251 of the submount 250 by performing bonding to be electrically conductive.

After the alignment is completed, the gripper 400 may be removed from the alignment jig 260.

The active alignment may be performed on all the optical units U by repeating the above steps.

Figure 9A:
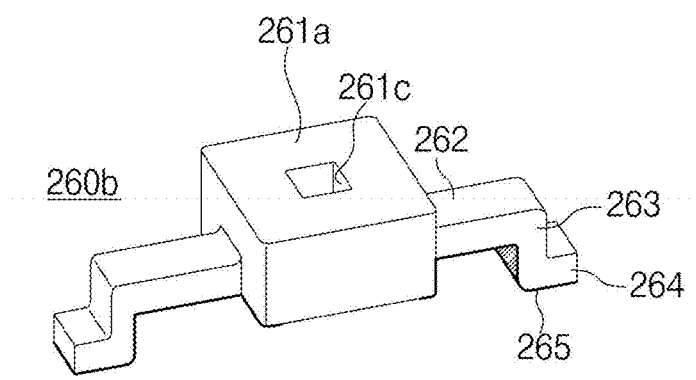
FIGS. 9A and 9B are perspective views illustrating an alignment jig according to another embodiment of the present invention.
Figure 9B:
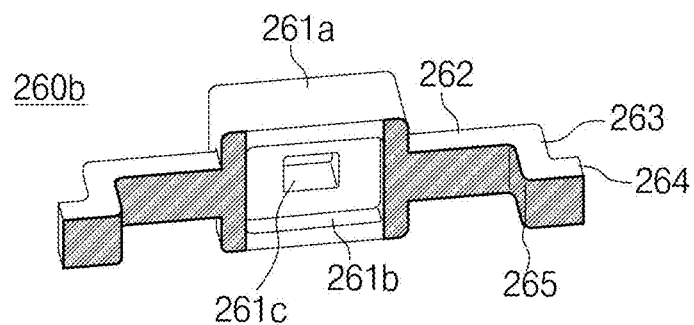
Figure 10:
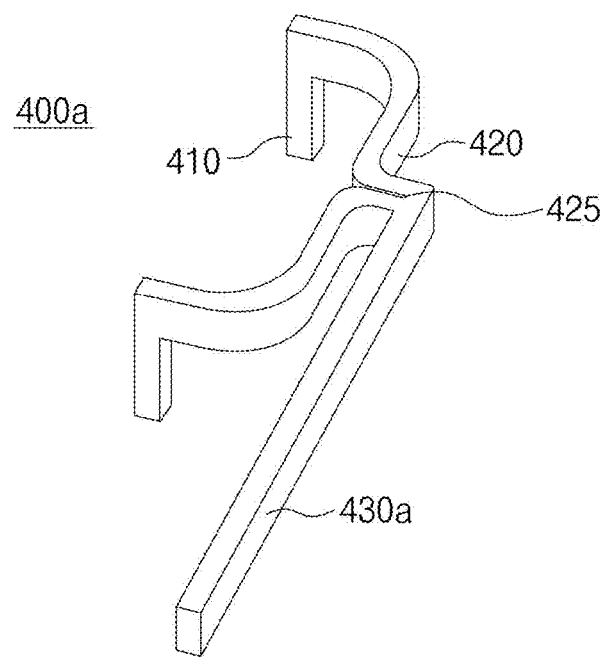
FIG. 10 is a perspective view illustrating a gripper according to another embodiment of the present invention.
Figure 11:
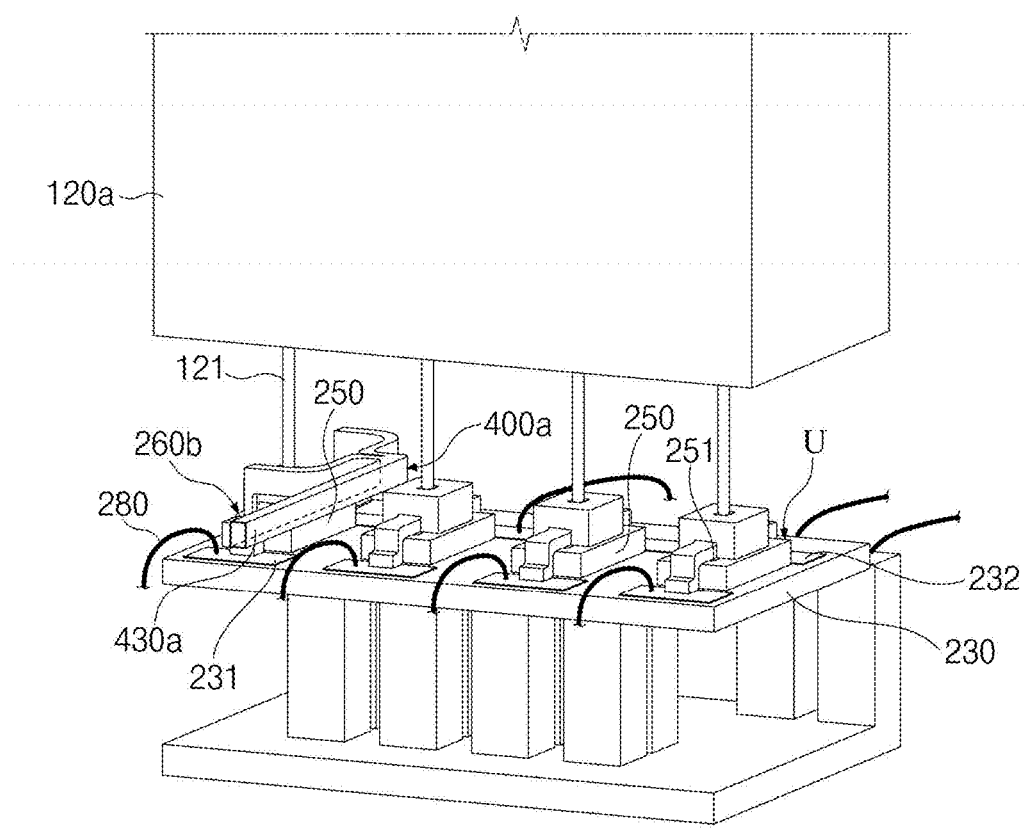
FIG. 11 is a perspective view for describing a method of performing active alignment on light source photodetector chips using the alignment jig of FIG. 9A and the gripper of FIG. 10.

FIGS. 9A and 9B are perspective views illustrating an alignment jig according to another embodiment of the present invention, FIG. 10 is a perspective view illustrating a gripper according to another embodiment of the present invention, and FIG. 11 is a perspective view for describing a method of performing active alignment on light source photodetector chips using the alignment jig of FIG. 9A and the gripper of FIG. 10.

Referring to FIGS. 9A and 9B, an alignment jig 260b according to another embodiment of the present invention is formed to have a thickness relatively greater than thicknesses of extension members 262, so that a guide ring 261a of the alignment jig 260b surrounds a circumferential surface of an optical fiber 121 for each channel illustrated in FIG. 11 in a noncontact state and an encapsulant used for butt coupling between the optical fiber 121 and a light source photodetector chip does not flow.

That is, like the alignment jig 260b (e.g., a B-type jig) of FIG. 9A and the alignment jig 260 (e.g., an A-type jig) of FIG. 3A, the alignment jigs 260 and 260b according to the present embodiments may have various shapes according to the optical subassembly packaging structure. Also, a bottom groove 261b for accommodating the light source photodetector chip of the optical unit may be further formed on a bottom surface of the guide ring 261a of the alignment jig 260b according to another embodiment. Also, a throughhole 261c of the guide ring 261a penetrating toward the bottom groove 261b has a size enough to insert the optical fiber 121 thereinto illustrated in FIG. 11 below.

Although not illustrated, wing members 264 of the alignment jig 260b according to another embodiment may be deformed to have the second wing member length m2 as described in FIG. 5.

As illustrated in FIG. 6, when optical coupling is performed between the light source photodetector chip 240 and the optical device using the lens 140, either the alignment jig 260b according to another embodiment or the alignment jig 260 may be used.

On the other hand, as illustrated in FIG. 11, an optical device 120a of the multi-channel optical subassembly structure according to another embodiment may be a device capable of focusing multi-channel light sources through respective optical fibers 121 provided for each light source photodetector chip. That is, the optical device 120a, which is an optical coupler or an optical splitter illustrated in FIG. 11, may be a lensless type device.

Each optical fiber 121 may be butt-coupled to the light source photodetector chip inside the optical unit. The light source photodetector chip and the optical fiber 121 are formed as an encapsulated structure. In such an encapsulated structure, the alignment jigs 260b illustrated in FIGS. 9A and 9B may be used. Here, the alignment jigs 260b according to another embodiment may serve as a mold for encapsulation.

Referring to FIG. 10, a gripper 400a according to another embodiment may be formed to have a different shape or may be designed to correspond to a structure of the multi-channel optical subassembly of FIG. 11.

That is, the gripper 400a may be formed in a cramp shape or a bending bar shape so that a handle 430a is bent and extends in a direction perpendicular to an extending direction of an incised portion 425 from bodies 420.

Since the handle 430a of the gripper 400a may be arranged so as to protrude from a space between the light source photodetector chips and a plurality of structures for encapsulating the optical fiber 121 toward a free space, the handle 430a does not act as an obstacle during active alignment and the active alignment may be easily performed.

According to the present invention, when packaging a single-mode and multi-channel optical subassembly, since a light source photodetector chip and a submount on which the light source photodetector chip is mounted can be moved using an alignment jig capable of electrical coupling in a state in which power is applied, without performing direct wire bonding on an individual light source photodetector chip, active alignment for each channel can be performed and optical coupling efficiency thereof can be improved.

Also, according to the present invention, since the entire submount on which the light source photodetector chip is mounted is not directly bonded to a thermoelectric element and an upper electrode pad of the submount is connected to one electrode pad or the other electrode pad of the thermoelectric element through the alignment jig, when a problem occurs in some or all channels, only a channel causing the problem can be replaced, and thus the optical subassembly structure can be reused.

Also, according to the present invention, since the alignment jig itself is a coupling means and an alignment means allowing the light source photodetector chip and the thermoelectric element to be conductive, when a problem occurs in some or all channels, only a channel causing the problem can be replaced, and thus time consumption for other processes can be reduced.

While the present invention has been particularly described with reference to exemplary embodiments, it will be understood by those of skilled in the art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

What is claimed is:

1. A multi-channel optical subassembly structure based on a transistor outline (TO) metal-can package, the multi-channel optical subassembly structure comprising:
   a module assembly mounted on a module housing of the multi-channel optical subassembly structure and having a plurality of lead pins arranged on a TO-stem;

a thermoelectric element arranged on an upper surface of the TO-stem with respect to a position between the lead pins and having one electrode pad and the other electrode pad formed on an upper surface thereof;

a plurality of submounts having a plurality of light source photodetector chips which are multi-channel light sources and photocouplers of the multi-channel optical subassembly structure each mounted by an upper electrode pad thereof, respectively, and arranged on the upper surface of the thermoelectric element so as not to be in contact with the one electrode pad and the other electrode pad; and an alignment jig configured to electrically connect the upper electrode pad of each of the submounts to the one electrode pad or the other electrode pad of the thermoelectric element so that fine alignment is performed while power is applied to the light source photodetector chips.

2. The multi-channel optical subassembly structure of claim 1, wherein the module assembly further includes a thermistor mounted on the other electrode pad of the thermoelectric element to measure a temperature of the module assembly.

3. The multi-channel optical subassembly structure of claim 2, further comprising an optical device, which is a lens-integrated planer light-wave circuit (PLC) device capable of focusing multi-channel light sources respectively emitted from the light source photodetector chips or a device capable of focusing the multi-channel light sources on each optical fiber provided for each light source photodetector chip.

4. The multi-channel optical subassembly structure of claim 3, further comprising a housing cover mounted on the TO-stem and coupled to an edge of the module housing, in which the optical device is provided, to protect the optical device, the thermistor, the lead pins, the thermoelectric element, the light source photodetector chips, the submounts, and the alignment jig from external environment.

5. The multi-channel optical subassembly structure of claim 1, wherein the alignment jig includes:

a guide ring including a hole having a size enough to be fitted into the light source photodetector chip or the optical fiber;

a pair of extension members configured to extend from one side surface and the other side surface of the guide ring to a side surface of the submount in a longitudinal direction of the submount, respectively;

leg members bent downward from ends of the extension members, respectively;

a pair of wing members bent from one ends of the leg members in an outward direction of the side surface of the submount; and metal coated portions integrally stacked on bottom surfaces of the wing members, bottom surfaces of the leg members, bottom surfaces of the extension members, and both side bottom surfaces of the guide ring, wherein one portion of the metal coated portion corresponding to the bottom surface of the wing member is in contact with the one electrode pad or the other electrode pad of the thermoelectric element, and the other portion of the metal coated portion corresponding to the bottom surface of the extension member is in contact with the upper electrode pad of the submount.

6. The multi-channel optical subassembly structure of claim 5, wherein the guide ring of the alignment jig is formed to have the same thickness as that of the extension member so as to surround side surfaces of the light source photodetector chip in a noncontact state.

7. The multi-channel optical subassembly structure of claim 5, wherein the guide ring of the alignment jig is formed to have a thickness relatively greater than that of the extension member so that the guide ring of the alignment jig surrounds a circumferential surface of the optical fiber in a noncontact state and an encapsulant used for butt coupling between the optical fiber and the light source photodetector chip does not flow.

8. The multi-channel optical subassembly structure of claim 5, wherein the wing member of the alignment jig has a first wing member length smaller than half a width of the one electrode pad or the other electrode pad or a second wing member length greater than half the width in order to use or replace the alignment jig.

9. The multi-channel optical subassembly structure of claim 5, wherein the alignment jig is formed of a ceramic material or an insulating material except for the metal coated portions.

10. The multi-channel optical subassembly structure of claim 5, further comprising a gripper capable of holding the leg members of the alignment jig so as to press the alignment jig placed on the submount toward the one electrode pad and the other electrode pad of the thermoelectric element or move the submount in a planar direction.

11. The multi-channel optical subassembly structure of claim 10, wherein the gripper includes:

a pair of tweezers spaced apart from each other in correspondence with a distance between the leg members located at both sides of the alignment jig in order not to be obstacles to light emitted during active alignment or the optical fiber;

bodies primarily bent horizontally at upper ends of the tweezers, respectively, secondarily bent toward an incised portion to be close to each other, joined to each other at the incised portion, and having an elastic force corresponding to a frictional force so that the tweezers exert the frictional force against outer surfaces of the leg members; and a handle integrated with the bodies at an opposite position of the tweezers.

12. The multi-channel optical subassembly structure of claim 11, wherein the gripper is formed in a straight bar shape so that the handle protrudes from the bodies in an extending direction of the incised portion.

13. The multi-channel optical subassembly structure of claim 11, wherein the gripper is formed in a bending bar shape so that the handle is bent and extends in a direction perpendicular to an extending direction of the incised portion from the bodies.

14. The multi-channel optical subassembly structure of claim 11, wherein the gripper is formed of a ceramic material or a metal material.

\* \* \* \* \*